United States Patent [19]

Hentschel et al.

[11] Patent Number: 4,494,870
[45] Date of Patent: Jan. 22, 1985

[54] ARRANGEMENT FOR SETTING OUT POINTS AND STRAIGHT LINES

[75] Inventors: Peter Hentschel; Wolfgang Meyl; Egon Seipelt, all of Dresden, German Democratic Rep.

[73] Assignee: Jenoptik Jena G.m.b.H., Jena, German Democratic Rep.

[21] Appl. No.: 263,785

[22] Filed: May 14, 1981

[30] Foreign Application Priority Data

Jun. 30, 1980 [DD] German Democratic Rep. ... 222231

[51] Int. Cl.³ .................... G01B 11/26; G01C 3/08; G01C 15/02
[52] U.S. Cl. ..................... 356/152; 33/293; 356/5
[58] Field of Search ............ 33/278, 293, 294, 296, 33/1 T, 1 CC, 1 DD; 356/5, 141, 152

[56] References Cited

U.S. PATENT DOCUMENTS 3,426,146  2/1969  Seaman .................... 356/152
3,799,674  3/1974  Guillet .................... 356/152
4,029,415  6/1977  Johnson ................... 33/294
4,030,832  6/1977  Rando et al. ............. 356/152
4,346,994  8/1982  Cruz ....................... 356/152

FOREIGN PATENT DOCUMENTS 623131  12/1977  Switzerland ............... 356/5

Primary Examiner—S. C. Buczinski

[57] ABSTRACT

The invention relates to an arrangement for setting out terrain points and straight lines comprising a tacheometer which emits a measuring beam and detects the same after reflection at a reflector, a means for interrupting the measuring beam which is intended to mark the place of the terrain point to be set out, a target at the same place, displaceable at least at right angles to the measuring beam, and means for indicating the position of the means for interrupting the beam relative to the latter. By virtue of the arrangement the operator setting out the terrain point is able to accomplish the task without the aid of the tacheometer operator.

3 Claims, 1 Drawing Figure

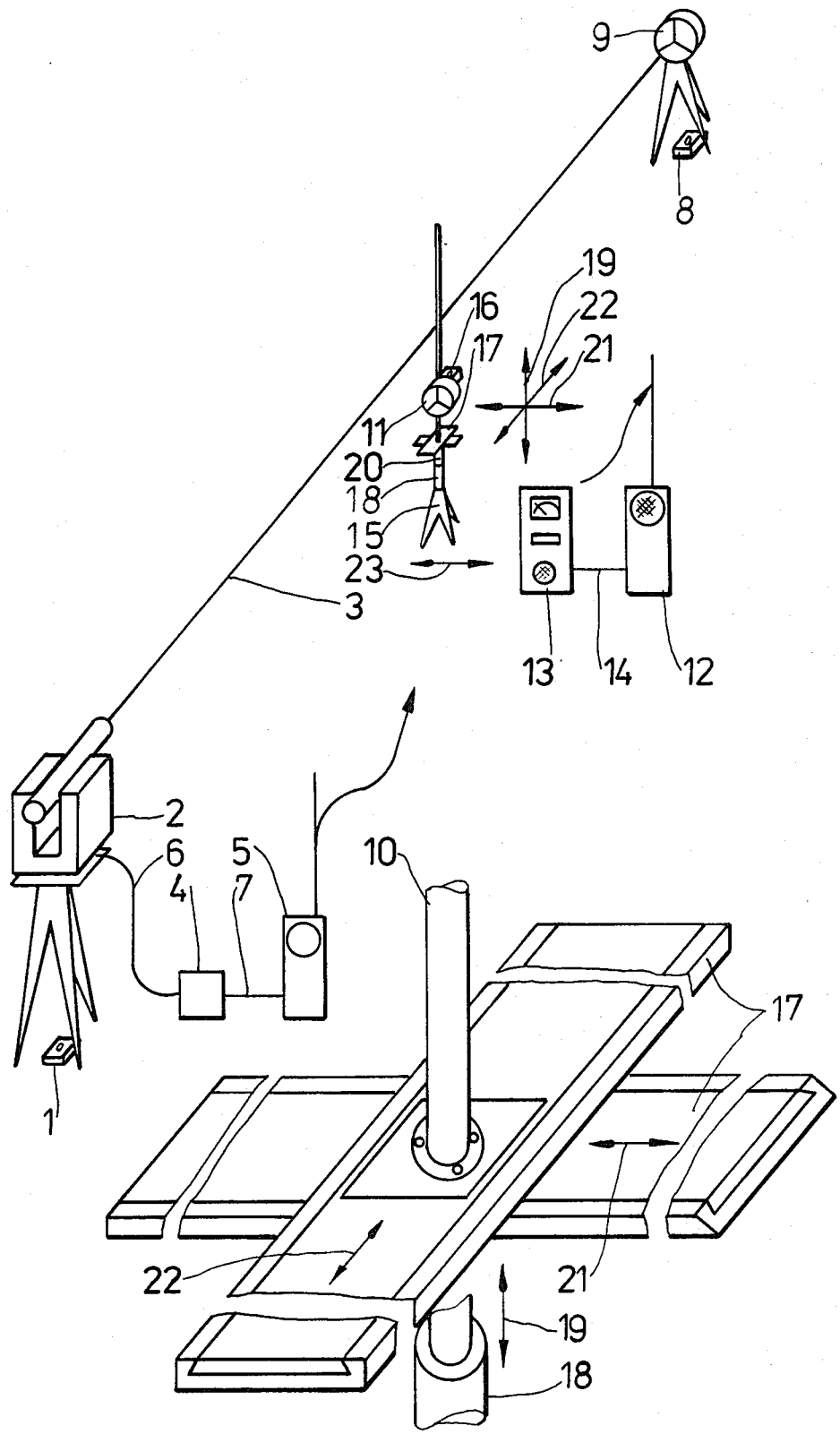

ARRANGEMENT FOR SETTING OUT POINTS AND STRAIGHT LINES

The invention relates to an arrangement for setting out terrain points and straight lines including an electromagnetic distance measuring device or tacheometer which emits a defined bundle of beams and detects the same, a target for marking a distance or a point therein, and means for transmitting and indicating measuring values and informations obtained for a terrain point to be measured.

The inventional arrangement is particularly for use in structural and civil engineering, as well as by constructing and assembling considerably large devices and vehicles, where the coordinates of (a) point(s) or straight lines are known and have to be transferred to a terrain, to a building or a vehicle.

In building engineering lasers are used as modern devices in alignment operations, and electronic tacheometers for measuring terrain points.

To mark a straight line through terrain points in nature the laser beam has to be detected by a suitable device such as a target plane, then the beam has to be centered and finally the center of the projected light spot has to be plumbed to the terrain.

In nature it is, however, difficult to detect the laser beam in bright direct sunshine or in the presence of any other radiant light source.

It is an essential disadvantage of the laser alignment devices that it is not possible to set out the given nominal points of a straight line without the help of an additional distance measuring device.

It is a further disadvantage that the laser beam endangers the eyes of a person moving in the operation field of the laser.

Electronic tacheometers employ light from the invisible range and permit the automatic distance measurement between the tacheometer station and the reflector station.

The result of the distance measurement is digitally indicated at the tacheometer. It is a condition for the distance measurement that the reflector is in the horizontal nominal direction. The difference between the actually measured distance and the desired nominal distance is transmitted to the operator at the reflector station for marking a terrain point.

Thus the operator obtains an information necessary for the local variation of the reflector station which, however, is not sufficient to obtain the nominal terrain point the coordinates of which are known and which is to be found in the terrain.

The operator requires two further informations, namely two local variation components with respect to the nominal terrain point so to approximate the latter with a sufficient enough precision.

In practice, these informations are transmitted from the tacheometer operator to the operator at the reflector by giving signs with the hand or by radio transmission.

All the aforesaid methods have the common disadvantage that the reflector operator can only successively approximate the nominal terrain point by instructions received from the tacheometer operator.

It is an object of the invention to obviate the above disadvantages.

It is a further object of the invention to increase the effectiveness of the electronic tacheometers used in setting out straight lines and to improve the working conditions of the operators.

It is still a further object of the invention to provide an arrangement for setting out straight lines or points therein or for alignment operations which the operator at a respective point to measured is able to perform by himself accurately and without aid from a central station.

These and other objects are realised by an arrangement for setting out straight lines or terrain points, comprising a tacheometer including an emitter and detector which emits a defined bundle of beams and detects the same, a target for marking said straight lines and the respective points, and means for transmitting and indicating measuring values and informations with respect to said terrain points to be measured.

According to the invention an interrupter is provided at the target for stopping the bundle of beams, displaceable at least at right angles to the bundle of beams.

Furthermore an indication means is provided for determining the position of the interrupter relative to the bundle of beams.

It is insignificant which kind of electromagnetic radiation is used.

Preferably optical radiation is used.

Alternatively the detector for the bundle of beams can be located at the transmitting means or at the interrupter.

Advantageously, the interrupter is embodied as a rod and provided with a leveling means.

Alternatively, the interrupter is embodied as an aperture.

Furthermore, it is advantageous that the interrupter is connected to the target and displaceable in parallel and at right angles to the bundle of beams.

The size of the displacements is measurable and can be read from respective indication means.

The position of the interrupter at right angles to the bundle of beams is indicated by an acoustic means which cooperates with an optical means.

The tacheometer or a rangemeter is set up at a starting point of the straight line to sight a first reflector at the end point of said straight line.

A point of said straight line is determined by virtue of the inventional arrangement constituted of the interrupter, the target and the indicating means An operator moves with the arrangement across the line between the tacheometer station and the reflector station. When the beam (straight line) is interrupted by the operator's body or by the interrupter the intensity of the radiation detected by the tacheometer is reduced. A respective intensity variation signal is transmitted by said transmitting means to the interrupter, where in the respective indication means the signal triggers both an audible and visible signal.

The visible signal represents the analog intensity variations at the location of the beam interruption.

Thus it is feasible to adjust the interrupter exactly in the center of the bundle of beams by small local displacements of the interrupter at right angles to the target beam until a minimum of intensity is obtained.

A second reflector attached to the interrupter is now vertically displaced with the latter until an intensity maximum is indicated.

In this case, the tacheometer detects the distance to the second reflector attached to the interrupter. The size of this distance or the difference between the latter and the nominal distance is digitalised in and transmitted by said transmitting means to the indication means at the interrupter for indication.

The entire operation is repeated until the required terrain point is set out precisely enough.

In a next step the distance between the installation point of the interrupter and the displaceable reflector can be read from a respective division. This relative height is subtracted from the known actual height of the bundle of beams at the set out point to obtain the absolute height of the installation point.

In order that the invention may be more readily understood reference is made to the accompanying drawing which illustrates diagrammatically and by way of example one embodiment thereof and where the drawing is a schematic perspective view of an arrangement according to the invention.

In the Fig. an electronic tacheometer 2 is located at the starting point 1 of a straight line to be set out.

The tacheometer 2 emits a measuring beam 3 and is connected via cables 6, 7 to a data compiler 4 and a walkie-talkie 5.

A reflector 9 is stationed at a point 8 at the end of said straight line 3.

An interrupter 10 with a reflector 11 is located at a point to be set out which is not particularly marked in the drawing.

The interrupter 10 cooperates with a walkie-talkie 12 and an electronic pocket device 13 (indication device), which are interconnected via a cable 14.

The walkie-talkie 12 and the device 13 serve to produce optical and audible signals.

In operation, the setting out starts with the tacheometer 2 sighting the reflector 9, in the type of operation "distance measurement", in that the beam 3 is directed to the reflector 9 where it is reflected back to the electronic tacheometer 2.

The intensity of the detected light and the digital value of the distance measured by the tacheometer 2 are fed into the device 4 for data processing.

The processed data are fed into the walkie-talkie 5 via the cable 7 and transmitted as signals to the walkie-talkie 12.

The electronic pocket device 13 amplifies and converts the transmitted signals. For example, the intensity is converted into audible and visible signals, and the value of the distance is digitally indicated.

The reflector 11 is provided with the rod 10 which serves as an interrupter, and is arranged upon a tripod 15, just as the tacheometer 2 and the reflector 9.

The reflector 11 is further provided with a leveling indicator 16 and a cross-slide 17 which is seated in a mount 20 of the tripod 15.

The mount 20 is vertically displaceable in a direction indicated by an arrow 19 along a guide 18 of the tripod 15.

The cross-slide 17 permits an accurate displacement of the reflector 11 in parallel, indicated by a double arrow 22, and at right angles, indicated by a double arrow 21, to the measuring beam 3.

The setting out of a point the coordinates of which are given in a building plan, for example, is carried out as follows.

An operator who wants to position the reflector 11 at said point which lies on the line 1–8 moves the tripod 15 across (arrow 21) the line 1–8 until the beam 3 is interrupted either by the operator himself or by the reflector 11 or the interrupter 10 (rod).

At this moment the electronic pocket device produces an audible signal which serves for a coarse adjustment of the point to be set out with a precision of less than 1 cm within the range of the line 1–8 at a distance of 100 meter from the tacheometer. This precision is obtained by the intensity of the audible signal.

The fine adjustment of the reflector 11 for obtaining the exact station of the required point is carried out in that the interrupter 10 is adjusted in a vertical position by means of the level 16 and moved in the direction of the arrow 21 at right angles to the beam 3 until the interrupter 10 is located in the beam 3 which is indicated by the electronic pocket device 13 as a minimum of the radiation intensity, since less light from the beam 1–8 arrives at the reflector 9 due to the interruption. The distance between the electronic tacheometer 2 and the interrupter 10 is determined by firstly displacing the reflector 11 in direction of the arrow 19 until the electronic pocket device 13 indicates an optical intensity maximum and then, with the reflector 11 in the beam 1–8, the distance is measured between the tacheometer 2 and the reflector 11.

The value of the corresponding distance or the difference between the latter and the nominal distance (given by the required point coordinates) is digitally indicated by the pocket device 13.

By means of the cross-slide 17 the reflector 11 is displaced in direction of the arrow 22 until the nominal (coordinate) position is obtained, that is, the difference between the distance indicated and the nominal distance becomes zero.

Due to the indicated values the operator repeats the adjustment steps and approximates the target point to be marked until said point is arrived at precisely enough. The stand 20 is provided with a not shown metric division for reading the vertical displacements of the reflector 11 until the beam 3 impinges upon the former, thus the intensity maximum is determined.

Furthermore, it is feasible to measure the cross-slide 17 displacements of the reflector 11.

We claim:

1. An arrangement for setting out terrain points and straight lines comprising
    a tacheometer for emitting a measuring beam and detecting the same,
        said tacheometer being stationed at a first end point of a straight line,
    a first reflector for marking a second end point of said straight line,
    a second reflector for setting out a terrain point on said straight line,
        said first reflector being for reflecting said measuring beam to said tacheometer, said tacheometer being for detecting the intensity of the reflected measuring beam and for measuring the distance between said first end point and said second reflector,
    means for converting said intensity and said distance measured into measuring signals and for transmitting said measuring signals,
        said means for converting and transmitting being connected to said tacheometer,
    an interrupter attached to said second reflector for interrupting said measuring beam and, hence, reducing said intensity,
    a tripod vertically adjustable,
    a cross-slide for horizontal displacements, said cross-slide being attached to the upper portion of said tripod, said interrupter and said second reflector being seated on said cross-slide, said tripod and said cross-slide being for displacing said interrupter and said second reflector at right angles and in parallel to said measuring beam, a measuring signal detector being stationed at the terrain point to be set out and being for detecting said measuring signals transmitted from said means for converting and transmitting, an indicating means being connected to said signal detector, for indicating said measuring signals and variations of said measuring signals at displacements of said interrupter and said second reflector.

2. Arrangement as claimed in claim 1, wherein said interrupter is a rod provided with a leveling means.

3. Arrangement as claimed in claim 1, wherein said indicating means includes means for producing audible and visible signals corresponding to the intensity of the reflected measuring beam and to the length of said distance measured, respectively.

* * * * *